United States Patent
Ando

(10) Patent No.: US 7,034,972 B2
(45) Date of Patent: Apr. 25, 2006

(54) OPTICAL SCANNING DEVICE AND IMAGE FORMING APPARATUS USING THE OPTICAL SCANNING DEVICE

(75) Inventor: Toshinori Ando, Tochigi (JP)

(73) Assignee: Canon Kabushiki Kaisha, Tokyo (JP)

(*) Notice: Subject to any disclaimer, the term of this patent is extended or adjusted under 35 U.S.C. 154(b) by 151 days.

(21) Appl. No.: 10/865,837

(22) Filed: Jun. 14, 2004

(65) Prior Publication Data

US 2004/0263934 A1    Dec. 30, 2004

(30) Foreign Application Priority Data

Jun. 27, 2003    (JP) ............................. 2003-185144

(51) Int. Cl.
   *G02B 26/08*    (2006.01)
(52) U.S. Cl. ...................... 359/196; 359/212; 359/216; 347/232; 347/259; 347/260
(58) Field of Classification Search ...................... None
See application file for complete search history.

(56) References Cited

U.S. PATENT DOCUMENTS

| | | | |
|---|---|---|---|
| 4,674,825 A | 6/1987 | Tateoka et al. | |
| 5,138,479 A | 8/1992 | Ando | 359/216 |
| 5,161,047 A * | 11/1992 | Tomita et al. | 359/216 |
| 5,241,174 A | 8/1993 | Ando | 250/235 |
| 5,323,183 A | 6/1994 | Tateoka et al. | 346/108 |
| 5,706,119 A | 1/1998 | Anzai | 359/216 |
| 5,991,063 A | 11/1999 | Ando | 359/204 |
| 6,239,894 B1 | 5/2001 | Ishibe | 359/205 |
| 6,507,427 B1 | 1/2003 | Yamawaki | 359/210 |
| 6,954,295 B1 * | 10/2005 | Ishibe | 359/196 |
| 2001/0012043 A1 | 8/2001 | Yamawaki et al. | 347/129 |
| 2001/0026391 A1 | 10/2001 | Ishibe | 359/196 |
| 2002/0001458 A1 | 1/2002 | Abelard et al. | 386/111 |
| 2002/0008896 A1 | 1/2002 | Ishibe | 359/205 |
| 2003/0085346 A1 | 5/2003 | Yamawaki | 250/234 |

FOREIGN PATENT DOCUMENTS

| | | |
|---|---|---|
| JP | 8-160338 | 6/1996 |
| JP | 2001-108926 | 4/2001 |
| JP | 2001-125033 | 5/2001 |

\* cited by examiner

*Primary Examiner*—James Phan
(74) *Attorney, Agent, or Firm*—Fitzpatrick, Cella, Harper & Scinto

(57) ABSTRACT

An optical scanning device has an incident optical system that makes a light beam emitted from a light source unit enter to a deflection surface of an optical deflector in a state in which the light beam has a larger width than a width of the deflection surface in a main scanning direction, and an imaging optical system that images the light beam reflectively deflected by the optical deflector onto a surface to be scanned. In the device, a slit member that restricts a diameter of the light beam in a sub-scanning direction is provided within an optical path between the optical deflector and the surface to be scanned. A peak intensity of a spot of the light beam scanned on the surface to be scanned is made constant, or substantially constant across an entire effective scanning region. A dependence on an angle of view of the peak intensity of the spot in the scanning optical system can thus be reduced, in particular, minute printing across an entire effective scanning region can be obtained even in a high-speed optical scanning device using an overfilled scanning optical system.

6 Claims, 6 Drawing Sheets

OPTICAL SCANNING DEVICE AND IMAGE FORMING APPARATUS USING THE OPTICAL SCANNING DEVICE

BACKGROUND OF THE INVENTION

1. Field of the Invention

The present invention relates to an optical scanning device and an image forming apparatus using the optical scanning device. In particular, the present invention relates to an optical scanning device suitably used for an image forming apparatus such as a digital copying machine or a laser beam printer employing an electrophotographic process, or a multi-function printer, in which light beam emitted from light source means is reflectively deflected by a polygon mirror as an optical deflector, a surface to be scanned is optically scanned with the light beam through a scanning lens system (imaging optical system), and image information is recorded.

2. Related Background Art

In recent years overfilled scanning optical systems (OFS scanning optical systems) have been utilized in optical scanning devices used in image forming apparatus such as laser beam printers, digital copying machines, and multi-function printers in order to deal with devices with higher speed and resolution, the system using a polygon mirror having a number of reflection surfaces (deflection surfaces) serving as deflection means, although their diameters are small.

With the overfilled scanning optical system, multiple surfaces can be achieved without making the polygon mirror size large, and it becomes possible to lighten a load of a motor that drives the polygon mirror and to perform high-speed scanning.

However, the overfilled scanning optical system has a problem in that the width of the reflected light beam from the polygon mirror in a main scanning direction changes together with angle of view (scanning angle), with the result that a spot size and a light amount distribution on the surface to be scanned become non-uniform across the scanning direction.

FIG. 7 is a diagram that shows a light beam state in the vicinity of an optical deflector in an optical scanning device using this type of overfilled scanning optical system.

An incident light beam 71 from a light source means (not shown) indicated by a dotted line in FIG. 7 is made incident at a larger width than the width in a main scanning direction of one facet (reflection surface) 76a of a polygon mirror 76 used as an optical deflector. A portion of the incident light beam 71 is then reflectively deflected by the facet 76a into a reflected light beam 72, and is guided to a surface to be scanned (not shown) through an imaging optical system. The width of the reflected light beam 72 in a main scanning direction at this point changes according to an angle $\phi$ at which the light beam is reflectively deflected by the polygon mirror 76. Even if an intensity distribution of the incident light beam 71 is taken as being constant along the width, the width of the reflected light beam 72 becomes narrower together with the rotation angle $\phi$ of the polygon mirror 76. As a result, an amount of the light reaching the surface to be scanned becomes smaller as the angle of view (scanning angle) becomes smaller, and the light amount distribution becomes non-uniform.

A variety of optical scanning devices in which the non-uniform light amount distribution is corrected have conventionally been proposed (refer, for example, to Japanese Patent Application Laid-Open Nos. 08-160338, 2001-108926 and 2001-125033).

In Japanese Patent Application Laid-Open No. 08-160338, a non-uniform light amount distribution on a surface to be scanned is corrected by inserting a filter having a transmittance distribution in a light beam that is entered to a polygon mirror. Further, in Japanese Patent Application Laid-Open Nos. 2001-108926 and 2001-125033, a non-uniform light amount distribution on a surface to be scanned is corrected by inserting a slit in a light beam that is entered to a polygon mirror.

In the publications described above, as for Japanese Patent Application Laid-Open Nos. 08-160338 and 2001-108926, correction is only performed with the objective of making the light amount distribution in the main scanning direction substantially constant on the surface to be scanned, out of consideration of changes in spot shape or changes in peak intensity due to changes in an F number of the light beam width in the main scanning direction. In Japanese Patent Application Laid-Open Nos. 2001-125033, two concepts of making the light amount distribution substantially constant by using a slit, and suppressing changes in the spot size surface area are disclosed. However, cases in which the two concepts are to be satisfied at the same time are not considered. Specifically, even if the amount of light of the reflected light beam 72 is made constant irrespective of the angle of view according to the method described above, the spot size varies on the surface to be scanned because the light beam width does not become constant. As a result, the peak intensity of the spot (imaging spot) varies despite the constant light amount. That is, for cases where an off-axis light beam width in a sub-scanning direction is expanded and its light beam amount is made substantially the same as an on-axis light beam amount, the spot in the sub-scanning direction becomes smaller than necessary, with the result that the peak intensity of the spot becomes larger than that on-axis.

In this state an exposure amount becomes constant for cases where the light beam is continuously kept on in an effective scanning region, but differences in printing quality develop according to the angle of view for cases where minute points are printed in order to form minute characters or halftone images. That is, the maximum value of the printing dot exposure distribution differs from that on-axis when the angle of view becomes large, and problems arise, for example, solid printing occurs or printing itself cannot be performed.

SUMMARY OF THE INVENTION

An object of the present invention is to provide an optical scanning device, and an image forming apparatus using the optical scanning device, in which dependence on an angle of view of a peak intensity of a spot is reduced in a scanning optical system, in particular, an optical scanning device in which minute printing can be obtained across an entire effective scanning region in a high-speed optical scanning device using an overfilled scanning optical system and an image forming apparatus using the optical scanning device.

According to one aspect of the invention, an optical scanning device includes: light source means; an optical deflector; an incident optical system that causes a light beam emitted from the light source means to be entered to a deflection surface of the optical deflector in a state where the light beam has a larger width than a width in a main scanning direction of the deflection surface; an imaging optical system that images the light beam reflectively deflected by the optical deflector onto a surface to be scanned; and a slit member that restricts a diameter of the light beam in a sub-scanning direction and is provided within an optical path between the optical deflector and the surface to be scanned, in which: a difference between peak intensities of spots of the light beam with which the surface to be scanned is scanned becomes ±10% or less in an entire effective scanning region.

According to further aspect of the invention, in the optical scanning apparatus, the slit member is formed such that a slit width in the sub-scanning direction gradually becomes large from a center portion toward a peripheral portion in the main scanning direction.

According to further aspect of the invention, in the optical scanning apparatus, an optical axis of the incident optical system and an optical axis of the imaging optical system coincide or substantially coincide with each other as viewed from above a main scanning surface.

According to another aspect of the invention, an image forming apparatus includes: the foregoing optical scanning device; a photosensitive member disposed on the surface to be scanned; a developing device that develops as a toner image an electrostatic latent image formed on the photosensitive member by using a light beam that is scanned by the optical scanning device; a transferring device that transfers the developed toner image to a transfer material; and a fixing device that fixes the transferred toner image to the transfer material.

According to another aspect of the invention, an image forming apparatus includes: the foregoing optical scanning device; and a printer controller that converts code data input from an external device to an image signal, and inputs the image signal into the optical scanning device.

According to another aspect of the invention, a color image forming apparatus includes: a plurality of image bearing members that form images in mutually different colors and are each disposed on a surface to be scanned of the foregoing optical scanning device.

According to further aspect of the invention, in the color image forming apparatus, the color image forming apparatus further includes a printer controller that converts color signals input from an external device to image data in different colors, and inputs the image data to the optical scanning devices respectively.

DETAILED DESCRIPTION OF THE PREFERRED EMBODIMENTS

Embodiment 1

Figure 1:
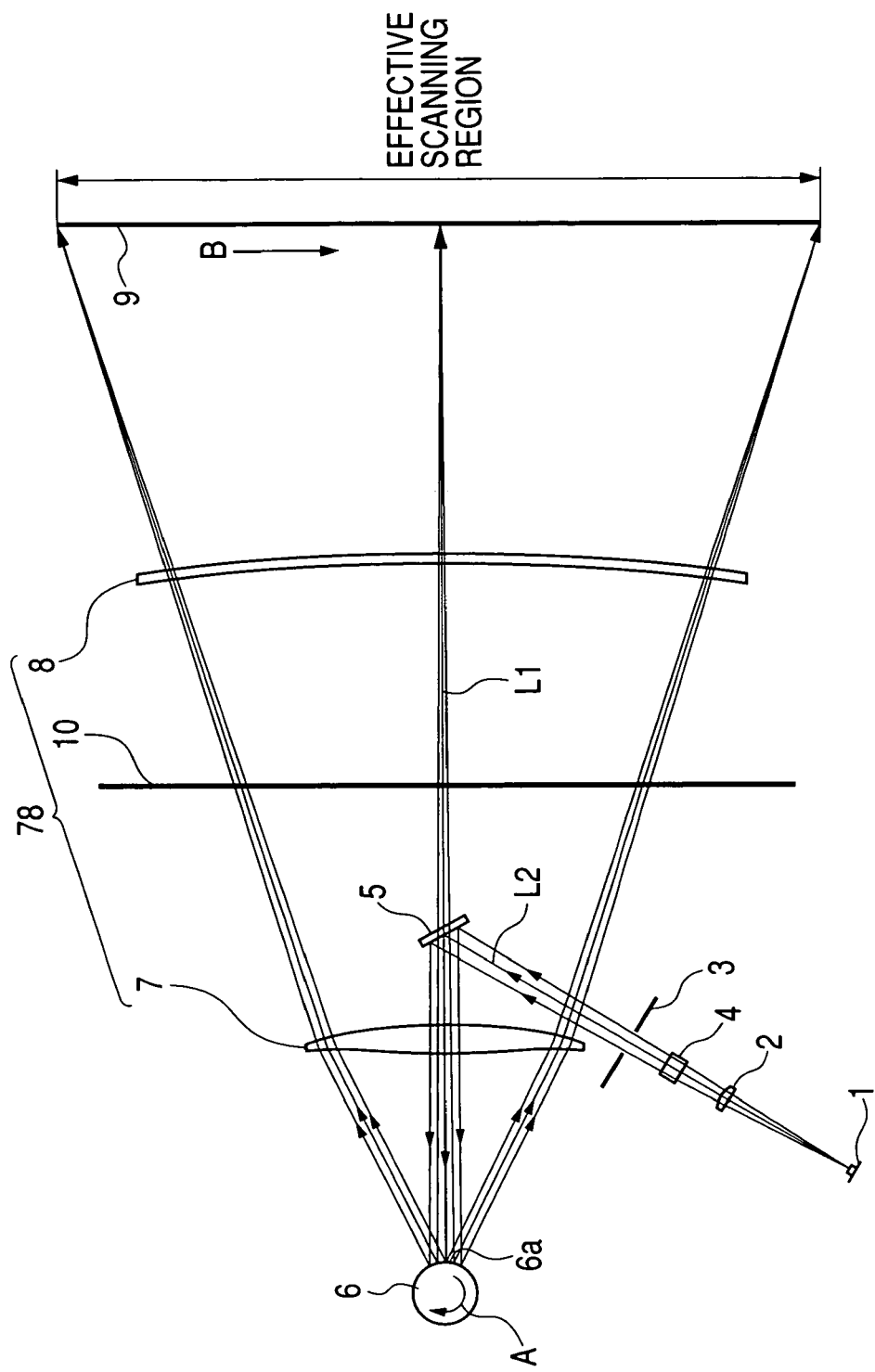
FIG. 1 is a main scanning cross sectional view of Embodiment 1 of the present invention.
Figure 2:
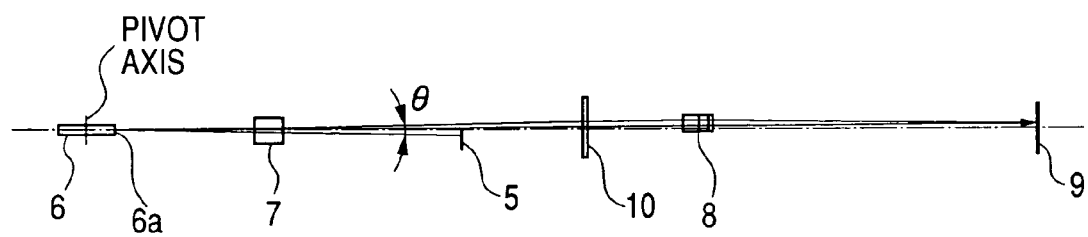
FIG. 2 is a sub-scanning cross sectional view of Embodiment 1 of the present invention.

FIG. 1 is a cross sectional view of main portions in a main scanning direction according to Embodiment 1 of the present invention (main scanning cross sectional view), and FIG. 2 is a cross sectional view of main portions in a sub-scanning direction according to Embodiment 1 of the present invention (sub-scanning cross sectional view).

The term main scanning direction means a direction that is perpendicular to a rotation-axis of an optical deflector and to an optical axis of an imaging optical system (a direction in which a light beam is reflectively deflected (deflectively scanned) by the optical deflector), and the term sub-scanning direction means a direction parallel to the rotation-axis of the optical deflector. Further, the term main scanning cross section means a plane that is parallel to the main scanning direction and includes the optical axis of the imaging optical system. Furthermore, the term sub-scanning cross section means a cross section that is perpendicular to the main scanning cross section.

In FIG. 1, reference numeral 1 denotes a light source means. The light source means is composed of a semiconductor laser, for example. Reference numeral 2 denotes a light beam converting element (collimator lens) for converting light beam emitted by the light source means 1 into a substantially parallel light beam (or a divergent light beam or a convergent light beam). Reference numeral 4 denotes a lens system (cylindrical lens). The lens system 4 has a predetermined power only in the sub-scanning direction, and focuses light beam that has passed through the collimator lens 2 into a substantially linear image on a deflection surface (reflection surface) 6a of a polygon mirror 6 described later, within the sub-scanning cross section. Reference numeral 3 denotes an aperture, and the aperture 3 regulates the light beam passing therethrough for beam shaping.

Reference numeral 5 denotes a return mirror, and the light beam regulated by the aperture 3 is reflected to the polygon mirror 6 side by the return mirror 5. Reference numeral 6 denotes a regular-polygon cylindrical optical deflector having a plurality of deflection surfaces, which includes a polygon mirror (rotational polygon mirror). Driving means such as a motor (not shown) causes the mirror to rotate at a constant speed in an arrow A direction in the figure.

It should be noted that each of the elements, such as the collimator lens 2, the cylindrical lens 4, the aperture 3, the return mirror 5, and a first scanning lens 7 configures an element of an incident optical system (light source portion).

In this embodiment, light beam emitted from the light source means 1 is made incident by the incident optical system to the reflection surface (deflection surface) 6a of the polygon mirror 6 within the main scanning cross section at a width that is wider than that of the deflection surface 6a.

Reference numeral 78 denotes an imaging optical system (scanning lens system) having a condensing function and an fθ characteristic. The imaging optical system 78 has two lenses in total, i.e., a first scanning lens 7 and a second scanning lens 8. Light beam, based on image information, reflectively deflected by the polygon mirror 6 is imaged to a spot on a photosensitive drum surface 9 as a surface to be scanned within the main scanning cross section. The imaging optical system 78 achieves an optical face tangle error correction function by satisfying a substantially optically conjugate relationship between the reflection surface 6a of the polygon mirror 6 and the photosensitive drum surface 9 within the sub-scanning cross section.

Reference numeral 10 denotes a slit member (hereinafter also referred to simply as "slit"), and the slit 10 is disposed within an optical path between the polygon mirror 6 and the photosensitive drum surface 9. The slit 10 restricts the diameter of the light beam in the sub-scanning direction, and further, makes the peak intensity of the light beam spot scanned on the surface to be scanned constant or substantially constant in an entire effective scanning region.

It should be noted that, although the slit member 10 is provided between the first scanning lens 7 and the second scanning lens 8 in FIG. 1, the slit member 10 may also be provided between the polygon mirror 6 and the first scanning lens 7 or between the second scanning lens 8 and the photosensitive drum surface 9. The slit may also be provided between the light source means 1 and the polygon mirror 6, but significant changes in the slit width with respect to the scanning direction are involved, the size of the passing light beam becomes large, and it is difficult to accurately regulate the width with respect to image height. For these and other reasons, it is preferable to provide the slit 10 within the deflected light beam between the polygon mirror 6 and the photosensitive drum surface 9.

The slit width (opening width) of the slit member 10 in the sub-scanning direction is defined so as to become gradually wider in the main scanning direction from a center portion (on-axis) to a peripheral portion (off-axis). That is, the slit width is defined in this embodiment to gradually become wider from an on-axis portion toward an off-axis portion so that the peak intensity of the spot in the effective scanning region end portion in a predetermined incident light beam amount distribution becomes identical to, or substantially identical to an on-axis intensity.

It should be noted that the term substantially constant (substantially identical) means that a difference in peak intensity between the center portion and the peripheral portion is equal to or less than ±10%, preferably equal to or less than ±5%, in the entire effective scanning region. Further, the predetermined light beam amount distribution is equal to or greater than 50% of the maximum intensity in an end portion of the polygon mirror in the effective scanning region end portion.

Reference numeral 9 denotes the photosensitive drum surface as a surface to be scanned, which is scanned with the spot at a constant speed.

With the configuration of this embodiment, an optical axis L1 of the scanning lens system 78 and a optical axis L2 of the incident optical system, which is made enter to the polygon mirror 6 from the light source means 1, coincide as viewed from an upper surface of the surface to be scanned 9, as shown in FIG. 1. A scanning optical system having the above configuration is referred to as an "on-axis incident optical system" hereinafter.

A divergent light beam emitted from the light source means 1 in this embodiment is converted to a substantially parallel light beam by the collimator lens 2, and is made enter to the cylindrical lens 4. The substantially parallel light beam that is made enter to the cylindrical lens 4 converges within the sub-scanning cross section, is regulated by the aperture 3, passes through the first scanning lens 7 via the return mirror 5, is made enter to the reflection surface 6a of the polygon mirror 6, and is imaged as a substantially linear image (linear image elongated in the main scanning direction) in the vicinity of the reflection surface 6a. The light beam made enter to the reflection surface 6a at this point is obliquely incident at a predetermined angle with respect to the reflection surface 6a (oblique-incidence optical system). Further, the light beam within the main scanning cross section is regulated, as is, by the aperture 3, passes through the first scanning lens 7 via the return mirror 5, and is made enter to the reflection surface 6a along the center line of, or along substantially the center line of, the deflection angle of the polygon mirror 6 (front incidence). The width of the substantially parallel light beam at this point is set to become sufficiently wide with respect to a facet width of the reflection surface 6a of the polygon mirror 6 in the main scanning direction (overfilled optical system).

The light beam that is reflectively deflected by the reflection surface 6a of the polygon mirror 6 is then imaged to a spot on the photosensitive drum surface 9 through the first scanning lens 7, the slit 10, and the second scanning lens 8. By rotating the polygon mirror 6 in the arrow A direction, the photosensitive drum surface 9 is optically scanned in an arrow B direction (main scanning direction). Thus, image recording is performed on the photosensitive drum surface 9 as a recording medium.

Figure 3:
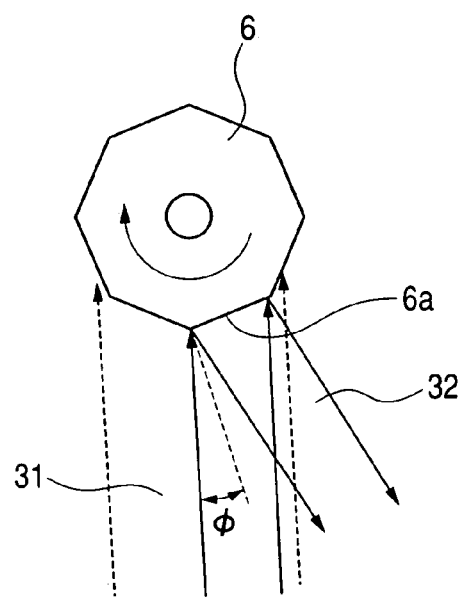
FIG. 3 is a diagram that shows an incident light beam and a reflected light beam in the vicinity of an optical deflector according to Embodiment 1 of the present invention.

FIG. 3 is a diagram that shows a state of a light beam in the vicinity of the polygon mirror of FIG. 1.

In FIG. 3, a region 31 denoted by dotted lines corresponds to an incident light beam that is incident from the incident optical system to the polygon mirror 6. Reference numeral 32 denotes a reflected light beam in a state where a portion of the light beam reflectively deflected by the reflection surface 6a of the polygon mirror 6 reaches the surface to be scanned, and the reflection surface 6a is one reflection surface (hereinafter, also referred to as "facet") of the polygon mirror 6, corresponding to the incident light beam 31.

The polygon mirror 6 rotates at a constant rotational speed, and reflectively deflects the incident light beam 31 on the facet 6a while it moves in the incident light beam 31. The width of the reflected light beam 32 at this point becomes widest when the facet 6a faces the incident light beam and a rotation angle $\phi$ in FIG. 3 is 0°, becoming equal to a facet width W6a. When the absolute value of the rotation angle $\phi$ increases along with rotation, the facet 6a inclines with respect to the incident light beam 31, and the width of the reflected light beam 32 determined thereby becomes small.

Provided that $W_0$ represents a width of the reflected light beam with a rotation angle of 0°, and the width is normalized to 1, a reflected light beam width $W(\phi)$ at rotation angle $\phi$ degree is:

$$W(\phi) = \cos \phi.$$

In addition, the incident light beam 31 that is incident from the incident optical system to the polygon mirror 6 generally has a non-uniform light intensity within the light beam.

Figure 4:
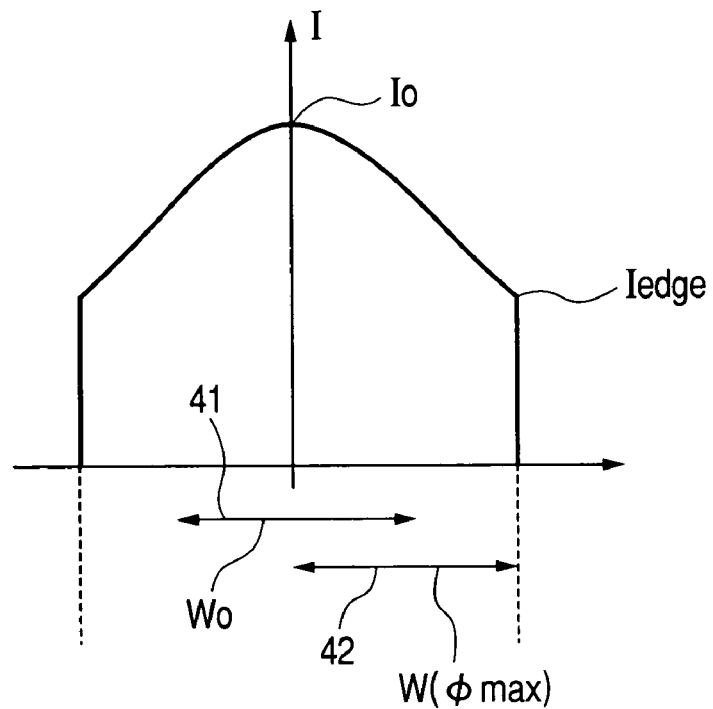
FIG. 4 is an intensity distribution diagram that shows an intensity distribution within a main scanning cross section of the incident light beam in FIG. 3.

FIG. 4 is an intensity distribution diagram that shows the light intensity of the incident light beam 31 within the main scanning cross section of the incident light beam 31 of FIG. 3. In FIG. 4, a vertical axis I represents a light intensity. The center of the light beam has the highest light intensity $I_0$, and the light intensity decreases from the center toward the periphery, to $I_{edge}$ at the periphery. This is because the semiconductor laser shown in FIG. 1 causes the light beam to diverge in a radial shape, and the highest light intensity is obtained at the center in the emission direction, while the light intensity decreases as the angle becomes larger. The incident light beam, which has been made into a substantially parallel light beam, thus also has a light intensity that decreases in the end portions of the light beam, as shown in FIG. 4.

A region $W_0$ indicated by an arrow 41 in FIG. 4 corresponds to the reflected light beam cut out by the facet 6a at the rotation angle of 0° of the polygon mirror 6 and a region $W(\phi max)$ indicated by an arrow 42 corresponds to the light beam reflected by the facet 6a at a rotation angle $\phi max$ of the polygon mirror 6. The rotation angle $\phi max$ is a polygon rotation angle when the endmost portion of the scanning region is scanned in the scanning optical system, and as described above, the region $W(\phi max)$ is expressed by:

$$W(\phi max)=W_0 \times \cos(\phi max).$$

Provided that the energy of the reflected light beam 32 can be obtained by integrating the intensity of the portion of the incident light beam 31 cut out by the facet 6a, the reflected light beam at the rotation angle of 0° has a light energy found by integrating a high intensity portion of the incident light, while the reflected light beam of the scanning region end portions has a light energy found by integrating a low intensity portion of the incident light beam, and the integration range is narrow that in the case where the rotation angle is 0°.

In addition, a change in width of the light beam in the main scanning direction according to the angle of view causes the spot size to change for cases where the light beam is imaged on the surface to be scanned. The spot size is generally inversely proportional to the light beam width provided that a focal distance in the optical path through which the light passes is constant.

Figure 5:
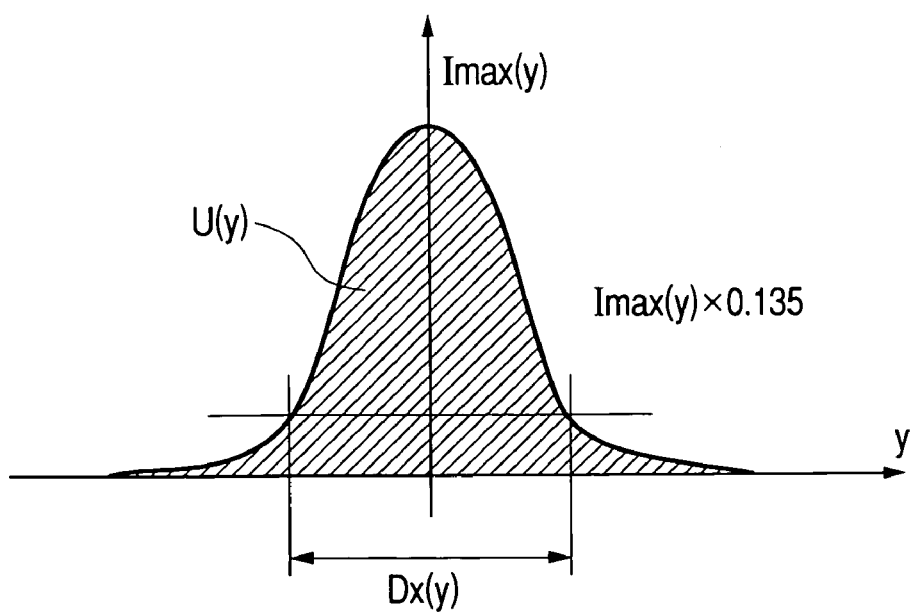
FIG. 5 is a diagram that shows a cross sectional shape in a main scanning direction of a spot imaged on a surface to be scanned.

FIG. 5 is a diagram that shows a cross sectional shape in a main scanning direction of a spot (imaging spot) that is imaged on a surface to be scanned. In FIG. 5, a horizontal axis y is a coordinate axis that represents a scanning position (image height position). $U(y)$ represents the total of the light energy of the imaging spots at the image height y, and $U(y)$ is equal to the energy of the light beam passing through the scanning optical system. Further, $Imax(y)$ represents a peak intensity of the imaging spot at the image height y. $Dx(y)$ represents an expanded width of the imaging spot in the main scanning direction (hereinafter referred to as "spot size"). Specifically, $Dx(y)$ represents the width where the peak intensity drops to $1/e^2$ thereof.

An expanded width $Dz(y)$ (spot size) of the imaging spot in the sub-scanning direction is assumed to be in the figure, but is omitted from the figure here. Taking the light energy $U(y)$ and the spot size $Dz(y)$ in the sub-scanning direction as being constant, the peak intensity $Imax(y)$ of the imaging spot decreases as the spot size $Dx(y)$ in the main scanning direction increases.

In practice, the light beam energy also decreases along with the angle of view, as described above, and therefore the peak intensity $Imax(y)$ of the imaging spot decreases.

Figure 6:
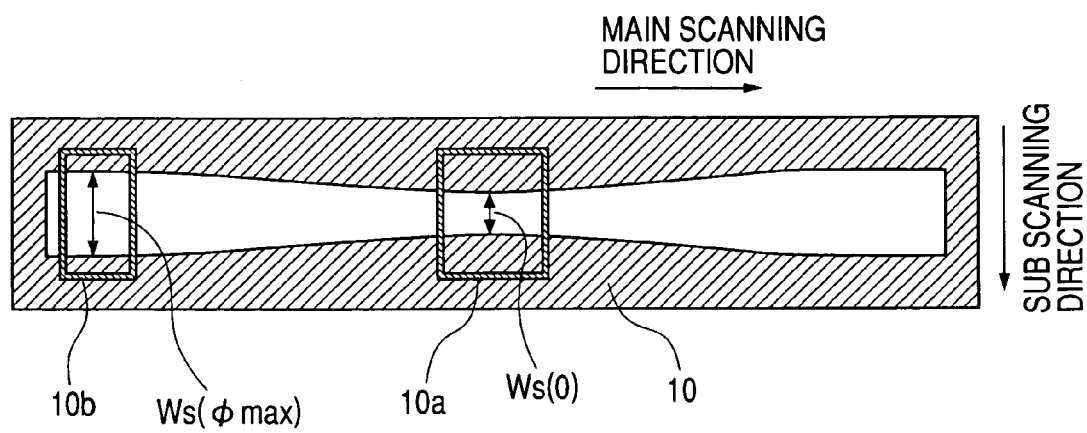
FIG. 6 is a diagram that shows a cross sectional shape of a slit and a light beam on the slit according to the present invention.
Figure 7:
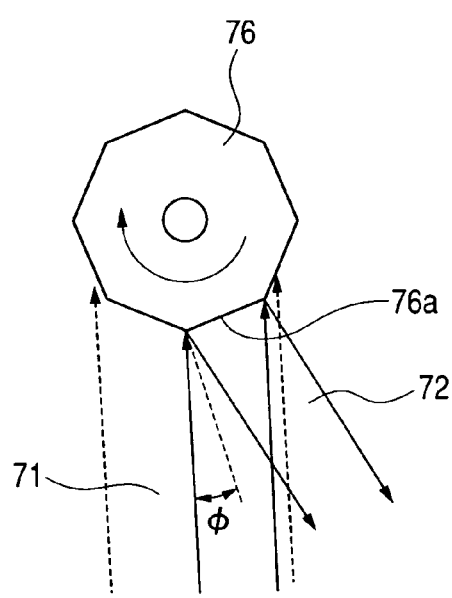
FIG. 7 is a diagram that shows an incident light beam and a reflected light beam in the vicinity of a conventional optical deflector.

FIG. 6 is a cross sectional view of main portions of the slit in this embodiment.

A longitudinal direction of the slit 10 in FIG. 6 corresponds to the vertical direction in FIG. 1, that is, to the main scanning direction. The transverse direction of the slit 10 corresponds to the sub-scanning direction. A black portion is a light-shielding portion, and the light beam only passes through the slit portion (white portion). The width of the center of the slit is narrow, and the width becomes larger with increasing the distance to the right and left ends from the center.

Here, the width in the sub-scanning direction need be larger not continuously but stepwise for ease of production.

Reference symbol 10a in FIG. 6 indicates a cross section of the light beam on-axis on the slit, and reference symbol 10b indicates a cross section of the light beam of the end portions of the scanning region. The width of the on-axis light beam 10a in the main scanning direction becomes larger for the reasons described above, and further, the energy of the light beam is also high. The width of the end-portion light beam 10b in the main scanning direction becomes narrower than that of the on-axis light beam for similar reasons, and the energy of the light beam is also low.

However, the width of the slit 10 in the sub-scanning direction is set to be narrow on-axis, and wide off-axis. The light beam that passes through the slit 10 therefore has a large energy reduction in the on-axis light beam, and a small energy reduction in the off-axis light beam. Accordingly, the difference in the energy of the imaging spot on the surface to be scanned 9 becomes small for cases where the slit 10 is used compared to cases where the slit 10 is not used. In addition, the width of the light beam in the sub-scanning direction becomes larger in the end-portion light beam, with the result that the spot size in the sub-scanning direction on the surface to be scanned becomes smaller and the peak intensity of the imaging spot in the end portions increases.

It is necessary to consider the transmittance distribution of the scanning optical system, changes due to aberration fluctuations according to the angle of view, and the like, other than the light beam intensity distribution, and vignetting by the facet described above, for the peak intensity of the imaging spot. There is no theoretical solution for the determination of the slit width. However, a specific slit shape model is made, in below provided that the influence of these factors is small.

(1) The angle at which the semiconductor laser used expands is taken as varying within full angle at half maximum (FFP) of 9° to 16°. The relationship between the angle and the intensity is in a Gaussian distribution.

(2) The F value of the collimator lens is taken as 7.

(3) The polygon mirror is taken as being octahedral, with a rotation angle of ±20.25°.

With this configuration, the light intensity. $I_{edge}$ of the incident light beam end portions is 56.5% when the FFP is 9°, and is 83.5% when the FFP is 16°. It is preferable to obtain the best solution between these extremes upon slit design, and therefore calculations are performed with the end portion intensity set to the geometrical mean value of 68.7%.

For cases where an energy $U(\phi max)$ of the reflected light beam is computed when the polygon mirror is rotated by 20.25° in this state, and the on-axis value is taken as 100%, $$U(\phi max)=87.2\%.$$

Further, the width $W(\phi max)$ of the light beam reduces according to a cosine function, and:

$$W(\phi max)=93.8\%.$$

From these, the peak intensity of the imaging spot in the effective scanning region end portions for cases where a slit is not used is expected to satisfy the following expression:

$$U(\phi max) \times W(\phi max)=81.8\%$$

with respect to the intensity of the on-axis light beam. As discussed above, it becomes necessary to additionally consider changes in the peak light amount due to aberrations of the lens, peak light amount changes according to transmittance and reflectivity of the optical system, and the like. These are omitted here, however.

Since both the increase in the light flux energy caused by the slit width expanding and the increase in the peak intensity due to reductions in the spot size in the sub-scanning direction are factored in, the slit width at the passing position of the end-portion light beam based on the above can be obtained by the calculation of the reciprocal of the square root of the intensity reduction amount.

A slit width S (φmax) in the end-portion light beam is expressed by:

$$S(\phi max) = 1/SQRT(U(\phi max) \times W(\phi max))$$
$$= 1.10.$$

and it is understood that increasing the width by 10% with respect to the passing position of the on-axis light beam suffices therefor. It is possible to make the peak intensity constant by performing similar computations across the entire effective scanning region.

For cases where the maximum peak intensity drops to 81.8% in a state where there is no slit, a slit may be designed and inserted according to the techniques of this embodiment, and the peak intensity can be made substantially constant across the entire effective scanning region.

The energy of the end-portion spot at this point is substantially as follows:

$$U(\phi max) \times S(\phi max) = 87.2 \times 1.10 = 96.4\%$$

which is not identical to that on-axis. However, the peak intensity of the imaging spot is equivalent or nearly equivalent, and there is no problem with normal printing, and good printing results can be obtained.

Further, if the FFP is assumed to be 9°, i.e., the lower limit of the variation in this state, the spot intensity at the effective scanning region end portions is 96.6% with respect to that on-axis. If the FFP is assumed to be 16°, at i.e., the upper limit of the variation, the spot intensity is 103.7% with respect to that on-axis, and both have fluctuations of within ±5%. A structure can thus be attained in which there are no problems with image formation.

The slit width of the slit member 10 disposed within the optical path between the polygon mirror 6 and the photosensitive drum surface 9, in the sub-scanning direction, is set so as to gradually become wider from the on-axis position to the off-axis position in the main scanning direction, as described above in this embodiment. The peak intensity of the imaging spot in the effective scanning region end portions can thus be made equivalent or substantially equivalent to that on-axis within the FFP variation range of the semiconductor laser used. Good printing can thus be obtained irrespective of the variation of the semiconductor laser.

When oblique incidence instead of opposite incidence (front incidence) is made, the slit opening has a laterally asymmetric shape. That is, the slit width corresponding to reflected light (small reflection angle) near the incident light beam narrows and expands on its opposite side.

Embodiment 2

Embodiment 2 of the present invention is explained next.

This embodiment differs from Embodiment 1 described above in that other factors in defining the peak intensity of the imaging spot are also considered in setting the slit shape. Other configurations and optical actions are substantially similar to those of Embodiment 1, and similar effects are thus obtained.

That is, in this embodiment the actual slit shape is set in consideration of influences on the spot shape of the transmittance of the optical system, the reflectivity distribution, blurring due to aberrations, the intensity distribution within the light beam, and the like.

In practice, a very high precision simulation or experiment is performed, and a slit width (opening width) in the sub-scanning direction may be determined such that the peak intensity of the imaging spot is substantially consistent between the periphery and the center of the effective scanning region in the FFP range used.

For example, a reduction in the peak intensity of the imaging spot in the light beam at both ends of the scanning region for a case in which the slit width in the sub-scanning direction is set to a fixed value $W_{so}$ across the entire region is computed or measured, and is represented by H. Next, the polygon rotation angle corresponding to the light beam is taken as φmax, and the slit width Ws(φmax) of the position at which the light beam passes therethrough may be determined as follows:

$$Ws(\phi max) = W_{so}/\text{sqrt}(H).$$

It should be noted that the width at other portions may also be determined, or by further increasing measurement points and determining the width at each point by the method described above, and then interpolating it with a polynomial function or the like. In this case, the width is not necessarily increased from the center toward the periphery.

Embodiment 3

Embodiment 3 of the present invention is explained next.

This embodiment differs from Embodiment 1 in that the slit 10 is disposed away from the polygon mirror 6 to such an extent that changes in the slit width in the sub-scanning direction fall within 5% in the light beam. Other configurations and optical actions are substantially similar to those of Embodiment 1, and similar effects are thus obtained.

That is, if the slit 10 becomes closer to the polygon mirror 6, the slit shape steeply changes, in particular, slit shape within the light beam steeply changes. It leads that problems such as the distorted imaging spot are likely to arise.

In this embodiment, the problems described above are solved by keeping the slit 10 away from the polygon mirror 6 to such an extent that changes in the slit width in the sub-scanning direction fall within 5% in the light beam.

Embodiment 4

Embodiment 4 of the present invention is explained next.

This embodiment differs from Embodiment 1 in that the light beam position on the slit 10 can be adjusted by adjusting the position and/or the angle of the return mirror 5. Other configurations and optical actions are substantially similar to those of Embodiment 1, and similar effects are thus obtained.

That is, while the problems described above are solved by placing the slit away from the polygon mirror as in Embodiment 3, in some cases, the light beam may be entered to the slit with a deviation in the sub-scanning direction.

By adjusting the position and/or the angle of the return mirror 5 in this embodiment for such cases, to allow adjustment for the light beam position on the slit, asymmetrical vignetting in the sub-scanning direction, fluctuations in the imaging spot, and the like are effectively prevented, and reductions in the intensity peak are corrected.

Embodiment 5

Embodiment 5 of the present invention is explained next.

This embodiment differs from Embodiment 1 in that the slit 10 can be rotatably adjusted with respect to the optical axis of the scanning lens system in the vertical direction and/or in the optical axis direction. Other configurations and optical actions are substantially similar to those of Embodiment 1, and similar effects are thus obtained.

That is, in this embodiment, an effective correction is preformed to avoid vignetting of the light beam by the slit 10 by making the slit 10 rotatably adjustable with respect to the optical axis of the scanning lens system in the vertical direction and/or in the optical axis direction.

Embodiment 6

Embodiment 6 of the present invention is explained next.

This embodiment differs from Embodiment 1 in that the slit 10 is configured to be movable in the scanning direction. Other configurations and optical actions are substantially similar to those of Embodiment 1, and similar effects are thus obtained.

That is, by configuring the slit 10 to be movable in the sub-scanning direction in this embodiment, asymmetric spot intensity distributions on the surface to be scanned due to asymmetric intensity distributions and the like in the light beam from the incident optical system can be effectively corrected.

Embodiment 7

Embodiment 7 of the present invention is explained next.

This embodiment differs from Embodiment 1 in that the slit 10 is formed in an arcuate shape that matches the light beam trajectory. Other configurations and optical actions are substantially similar to those of Embodiment 1, and similar effects are thus obtained.

With the on-axis incident optical system, the light beam is made enter to the polygon mirror rotation plane at an angle within the sub-scanning cross section in order to separate the light beam entered to the polygon mirror and the emitted light beam. The light beam that is reflectively deflected is therefore scanned along a curved surface of a conical shape, and the light beam trajectory on the planar slit takes on an arcuate shape.

Curvature of the scanning line can effectively be corrected in this embodiment by forming the slit in an arcuate shape matching the light beam trajectory.

Embodiment 8

Embodiment 8 of the present invention is explained next.

This embodiment differs from Embodiment 1 in that the slit 10 is not formed in a planar shape. A portion of the slit 10 is curved. Other configurations and optical actions are substantially similar to those of Embodiment 1, and similar effects are thus obtained.

That is, the scanning line curvature can be effectively corrected in this embodiment by forming the slit not in a planar shape, but in a curved shape so that its periphery is close to the polygon mirror.

It should be noted that the slit 10 can be easily formed if sheet metal or a resin having flexibility is used therefor, a guide is formed in an attachment portion, and the slit is disposed along the guide.

Embodiment 9

It should be noted that, although the overfilled scanning optical system is discussed in each of the above embodiments in relation to the development of fluctuations in the peak intensity of the imaging spot on the surface to be scanned, Embodiment 9 is not limited to the overfilled scanning optical system.

For example, the energy of the scanning light beam fluctuates according to the angular characteristics of the polygon mirror reflection surface, the angular characteristics of the surface reflection of the scanning lens, and the angular characteristics of the return mirror and the like. Further, the sensitivity of photosensitive members also changes according to the angle of view. This is supposedly because the reflectivity of the photosensitive surface changes according to the angle, and reflection losses change according to the angle of view.

In a scanning optical system with a predetermined image height (scanning position), the peak intensity of the imaging spot when the slit width is constant is represented by la, and a desired peak intensity is represented by li. The slit width in the position at which the light beam passes therethrough, which is changed to the image height, may be set to be sqrt(li/la). Effects similar to those of the embodiments described above can thus be obtained.

Image Forming Apparatus

Figure 8:
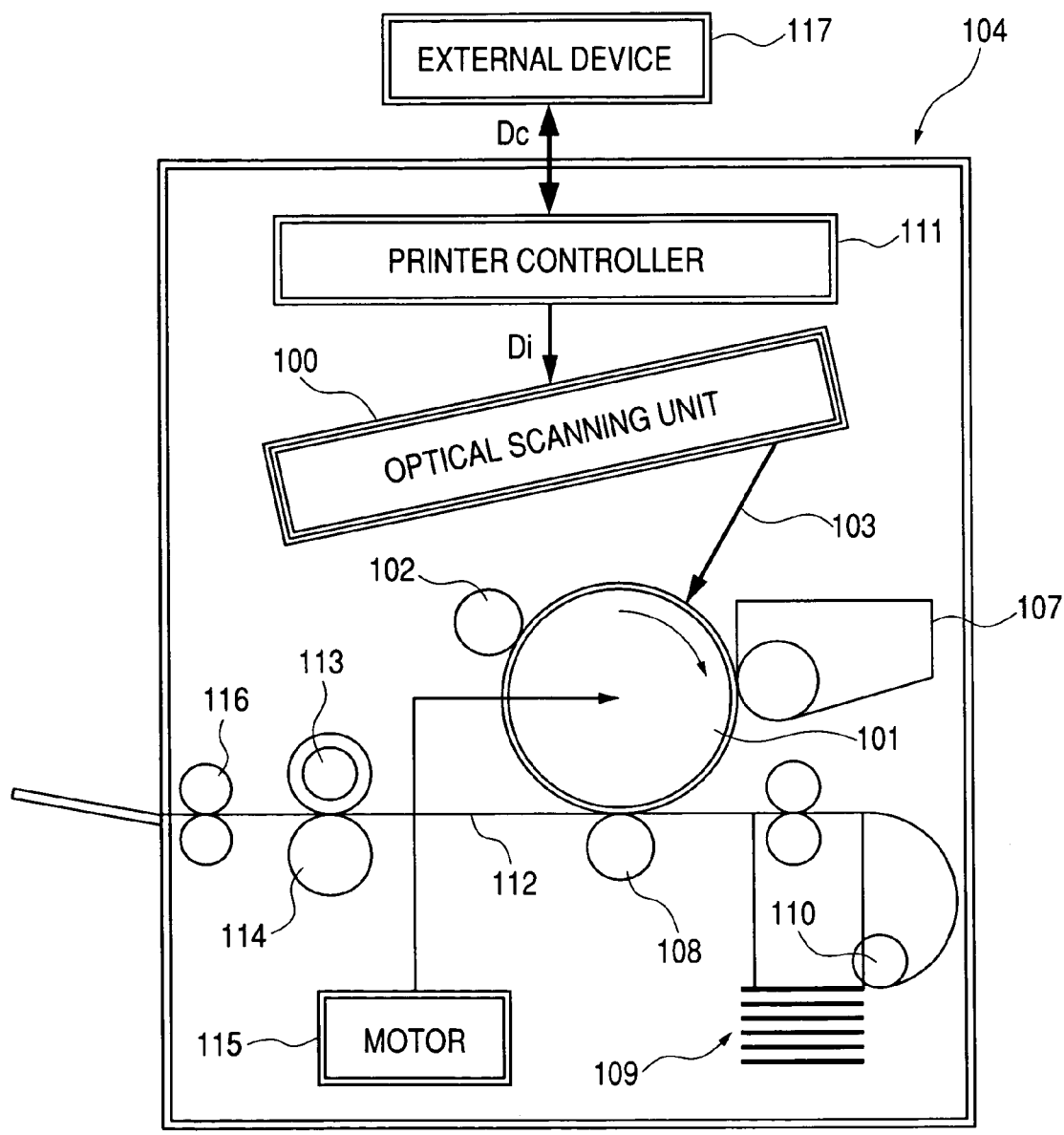
FIG. 8 is a cross sectional view of main portions of an image forming apparatus according to the present invention.

FIG. 8 is a main portion cross sectional view in a sub-scanning direction that shows an embodiment of an image forming apparatus of the present invention. In FIG. 8, reference numeral 104 denotes an image forming apparatus. Code data Dc is input to the image forming apparatus 104 from an external device 117 such as a personal computer. The code data Dc is converted into image data (dot data) Di by a printer controller 111 within the apparatus. The image data Di is input to an optical scanning unit 100 having the configuration described in any of Embodiments 1 to 9. A light beam 103 that is modulated according to the image data Di is emitted from the optical scanning unit 100, and a photosensitive surface of a photosensitive drum 101 is scanned with the light beam 103 in a main scanning direction.

The photosensitive drum 101 as an electrostatic latent image bearing member (photosensitive member) is rotated in a clockwise direction by a motor 115. The photosensitive surface of the photosensitive drum 101 then moves relative to the light beam 103 in a sub-scanning direction that is orthogonal to the main scanning direction along with this rotation. A charging roller 102 that can uniformly charge the surface of the photosensitive drum 101 is disposed above the photosensitive drum 101 so as to abut against the surface of the photosensitive drum 101. The surface of the photosensitive drum 101 charged by the charging roller 102 is then irradiated with the light beam 103, which is scanned by the optical scanning unit 100.

As explained above, the light beam 103 is modulated based upon the image data Di. An electrostatic latent image can be formed on the surface of the photosensitive drum 101 by irradiating the light beam 103. The electrostatic latent image is developed as a toner image by a developing device 107 that is disposed so as to abut against the photosensitive drum 101 downstream of the irradiation position of the light beam 103 in the rotation direction of the photosensitive drum 101.

The toner image developed by the developing device 107 is transferred onto a sheet 112 that is a transfer material by a transferring roller 108 that is disposed below the photosensitive drum 101 while opposing the photosensitive drum 101. The sheet 112 is contained within a sheet cassette 109 in front of the photosensitive drum 101 (on the right side in FIG. 8), but it is also possible to manually feed the sheet. A sheet feed roller 110 is disposed in an end portion of the sheet cassette 109. The sheet feed roller 110 sends the sheets 112 within the sheet cassette 109 to a transport path.

The sheet 112 onto which an unfixed toner image has thus been transferred is then transported to a fixing device behind the photosensitive drum 101 (on the left side in FIG. 8). The fixing device is configured by a fixing roller 113 having a fixing heater (not shown) in an inner portion, and a pressurizing roller 114 that is disposed so as to come into press contact with the fixing roller 113. The sheet 112 that is transported from a transferring part is heated while being pressurized at a press-contacting portion between the fixing roller 113 and the pressurizing roller 114, and the unfixed toner image on the sheet 112 can thus be fixed. In addition, a delivery roller 116 is disposed behind the fixing roller 113, and the sheet 112 having the image fixed thereon can be discharged to the outside of the image forming apparatus.

Although not shown in FIG. 8, the print controller 111 not only converts data as explained above, but also performs control of each part within the image forming apparatus, including the motor 115, and the polygon motor and the like within the optical scanning unit, as described hereinafter.

Color Image Forming Apparatus

Figure 9:
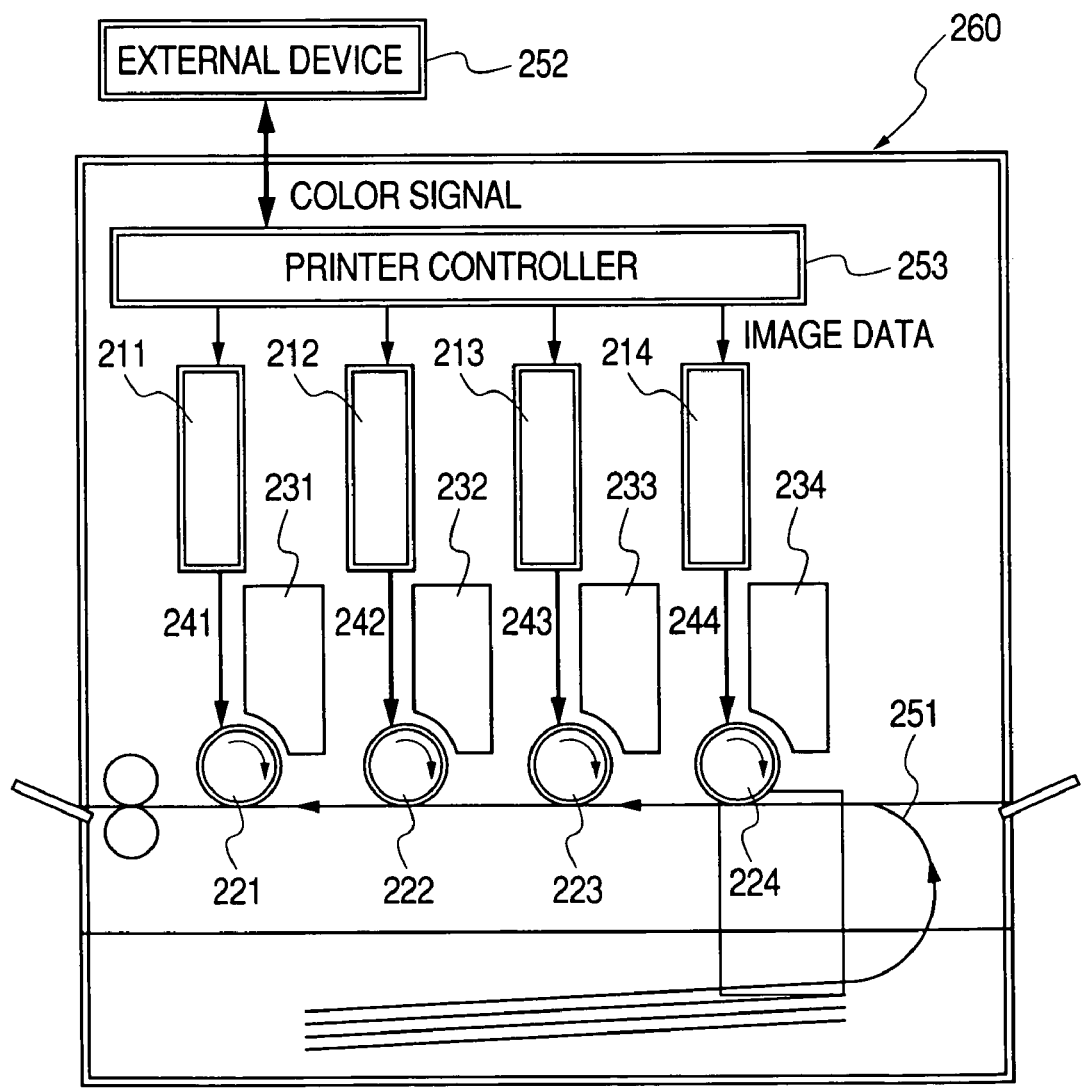
FIG. 9 is a cross sectional view of main portions of a color image forming apparatus according to the present invention.

FIG. 9 is a schematic diagram of main portions of a color image forming apparatus according to an embodiment of the present invention. This embodiment is a tandem type color image forming apparatus that records image information on surfaces of photosensitive drums, which are image bearing members, using four optical scanning devices arranged in parallel. In FIG. 9, reference numeral 260 denotes a color image forming apparatus, reference numerals 211, 212, 213, and 214 each denote an optical scanning device having a configuration of any of Embodiments 1 to 9, reference numerals 221, 222, 223, and 224 each denote a photosensitive drum used as an image bearing member, reference numerals 231, 232, 233, and 234 each denote a developing device, and reference numeral 251 denotes a conveyor belt.

In FIG. 9, R (red), G (green), and B (blue) color signals are input to the color image forming apparatus 260 from an external device 252 such as a personal computer. The color signals are converted into C (cyan), M (magenta), Y (yellow), and B (black) image data (dot data) by a printer controller 253 within the apparatus. The image data are input to the respective optical scanning devices 211, 212, 213, and 214. Light beams 241, 242, 243, and 244 that are modulated according to the respective image data are then emitted from the optical scanning devices, and photosensitive surfaces of the photosensitive drums 221, 222, 223, and 224 are scanned with the light beams in a main scanning direction.

The color image forming apparatus in this embodiment is one in which the four optical scanning devices (211, 212, 213, and 214) are arranged corresponding to C (cyan), M (magenta), Y (yellow) and B (black), and image signals (image information) are recorded onto the surfaces of the photosensitive drums 221, 222, 223, and 224, respectively, in parallel, thus printing a color image at high speed.

The color image forming apparatus in this embodiment forms latent images of each color on the surfaces of the corresponding photosensitive drums 221, 222, 223, and 224 by using light beams based on the image data from the four optical scanning devices 211, 212, 213, and 214, as described above. A single full color image is then formed by multiple transferring the images onto a recording material.

A color image reading device provided with a CCD sensor may be used as the external device 252, for example. In this case a color digital copying machine is configured by the color image reading device and the color image forming apparatus 260.

According to the present invention, an optical scanning device, and an image forming apparatus using the optical scanning device can be achieved. The optical scanning device has a simple configuration in which the dependence on the angle of view of the peak intensity of a spot in the scanning optical system can be reduced by disposing an appropriately defined slit member between the optical deflector and the surface to be scanned as described above, in particular, in which minute printing across an entire effective scanning region can be obtained even for a high-speed optical scanning device using an overfilled scanning optical system.

What is claimed is:

1. An optical scanning device comprising:
   light source means;
   an optical deflector;
   an incident optical system that causes a light beam emitted from the light source means to be entered to a deflection surface of the optical deflector in a state where the light beam has a larger width than a width in a main scanning direction of the deflection surface;
   an imaging optical system that images the light beam reflectively deflected by the optical deflector onto a surface to be scanned; and
   a slit member that restricts a diameter of the light beam in a sub-scanning direction and is provided within an optical path between the optical deflector and the surface to be scanned,
   wherein a difference between peak intensities of spots of the light beam with which the surface to be scanned is scanned becomes ±10% or less in an entire effective scanning region.

2. An optical scanning device according to claim 1, wherein the slit member is formed such that a slit width in the sub-scanning direction gradually becomes large from a center portion toward a peripheral portion in the main scanning direction.

3. An optical scanning device according to claim 1, wherein an optical axis of the incident optical system and an optical axis of the imaging optical system coincide with each other as viewed from above a main scanning surface.

4. An image forming apparatus comprising:
   the optical scanning device according to any one of claims 1, 2, and 3;
   a photosensitive member disposed on the surface to be scanned;

a developing device that develops as a toner image an electrostatic latent image formed on the photosensitive member by using a light beam that is scanned by the optical scanning device;

a transferring device that transfers the developed toner image to a transfer material; and a fixing device that fixes the transferred toner image to the transfer material.

5. An image forming apparatus comprising:

the optical scanning device according to any one of claims 1, 2, and 3; and a printer controller that converts code data input from an external device to an image signal, and inputs the image signal into the optical scanning device.

6. A color image forming apparatus comprising:

a plurality of image bearing members that form images in mutually different colors and are each disposed on a surface to be scanned of the optical scanning device according to any one of claims 1, 2, and 3.

* * * * *